June 29, 1971 G. P. HEILMAN 3,588,968
FASTENER DEVICE
Filed Feb. 6, 1969 2 Sheets-Sheet 1
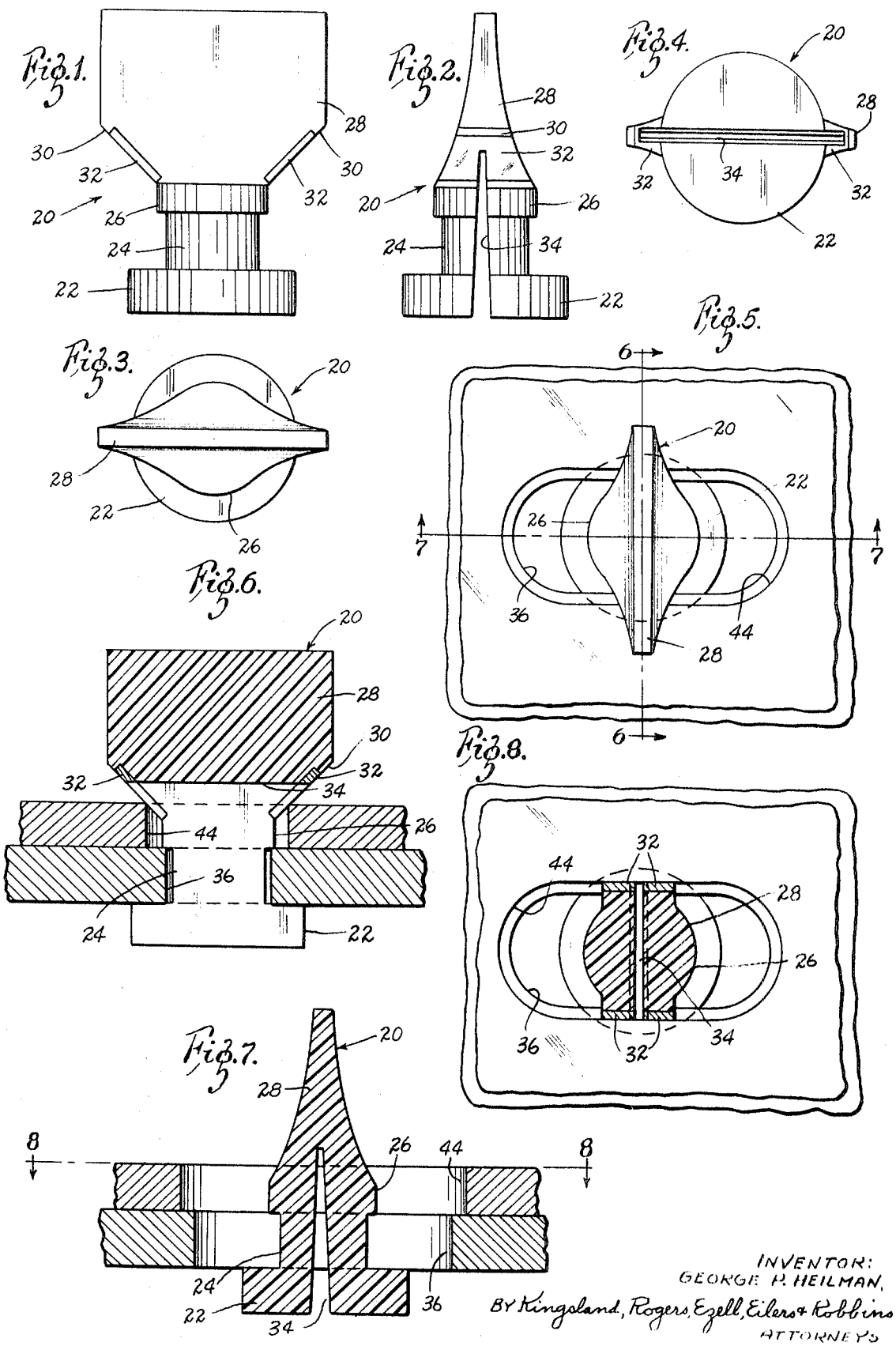
INVENTOR:
GEORGE P. HEILMAN,
BY Kingsland, Rogers, Ezell, Eilers & Robbins
ATTORNEYS June 29, 1971  G. P. HEILMAN  3,588,968

FASTENER DEVICE

Filed Feb. 6, 1969

INVENTOR:
GEORGE P. HEILMAN,
By Kingsland, Rogers, Ezell, Eilers & Robbins
ATTORNEYS

United States Patent Office 3,588,968
Patented June 29, 1971

3,588,968
FASTENER DEVICE
George P. Heilman, 290 Phillip Hill Road,
New City, N.Y. 10956
Filed Feb. 6, 1969, Ser. No. 797,176
Int. Cl. A44b 17/00; F16b 2/14, 5/06
U.S. Cl. 24—221L                     10 Claims

ABSTRACT OF THE DISCLOSURE

A plastic fastener device for fastening two plates together. The fastener is adapted to be inserted through a slot in a base plate and receive a removable plate in locking relation. The fastener has a wing headed handle connected to a shank and an enlarged base portion. Merging with the shank and forming an under portion of the wing headed handle is a cam surface which is adapted upon rotation to bear with a slight degree of resiliency against edges of the slot of the top plate in binding and locking relation. The shank is split such that the fastener can be inserted through a slot in the base plate and retained in place. Through simple rotation of the fastener, the top plate can be unlocked by registration of the slot in the top plate with the wing headed handle for ready removal of the top plate.

SUMMARY OF THE INVENTION

Figure 9:
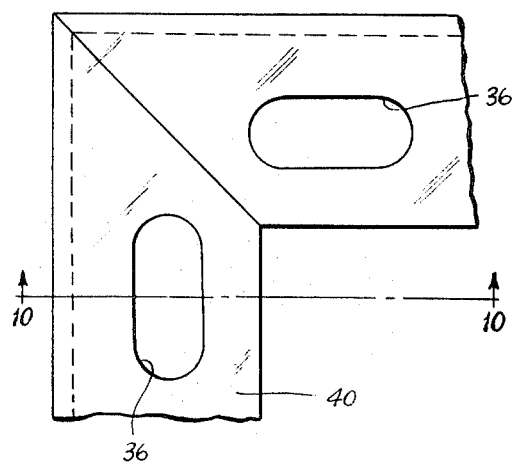

In the past, various types of fastener devices have been employed for connecting a cover plate to a base plate, frame, or other type of base. Such fastener devices may be typified by that shown in the Preziosi Pat. No. 3,220,078, in which a fastener is attached to a base and has overlying wing portions which interfit within a slot in the top plate. The wing portion may be rotated such that it overlies the top plate adjacent the slot and bears against it to hold it against the base. Such devices require affixation to a base, usually requiring a second piece part to complete the assembly. Other devices in the art are similar in requiring either affixation to a base or a complicated interfitting structure, together with an overlying bearing portion holding the top plate to a base. Such structures are subject to bending and breakage and flexing over periods of usage destroying or impairing their utility.

By means of this invention there has been provided a simple plastic fastener device which can be readily inserted in a base plate through a slot and retained therein, whether connected to a top plate in locking position or whether the top plate is removed. The fastener is simple in construction and, through a novel, slightly resilient camming surface, which is wedged or locked against the inner edges of the slot of the top plate, provides a firm locking position.

The fastener device is readily inserted in a slot in a base plate through a wing headed handle, which fits through the slot. After insertion, the fastener is retained in the base plate, through expansion of the shank, which has a vertical slot that is impressed in the insertion operation. A shallow, cylindrical, enlarged, base at the bottom of the fastener device fits over and expands beyond the edges of the slot and the base plate and serves as a retainer. The wing headed handle is provided with a downwardly converging cam surface which merges into the surface of the cylindrical shank of the device, such that when the top plate is fitted over the bottom plate the fastener device can be rotated from registry with the longitudinal axis of the slot to a position perpendicular to it with the same surface binding against the inside surfaces of the slot in the base plate. The two plates are in this manner locked together and can be simply unlocked by rotating the wing headed handle of the fastener to registration with the slot in the top plate, whereby the top plate can be simply removed.

The fastener of this invention makes it possible to remove in a matter of a second or two the cover plate and any variety of plates or other types of structures that are desired to be connected to a base. The fastener can be used by unskilled operators in an obvious manner and can be constructed of conventional plastic materials at a very low cost lending itself to use in a large variety of situations. Where the fastener is to be used for repeated locking and unlocking, a wear plate can be inserted or cast in the cam surface, which has a higher degree of wear resistance than the plastic material from which the fastener device is constructed. Thus, the fastener device lends itself to use in a manifold number of ways.

The above features are objects of this invention and further objects will appear in the detailed description which follows and will otherwise be apparent to those skilled in the art.

For the purpose of illustration of this invention, there will be shown in the accompanying drawings a preferred embodiment thereof. It is to be understood that these drawings are for the purpose of illustration only and that the invention is not limited thereto.

Figure 11:
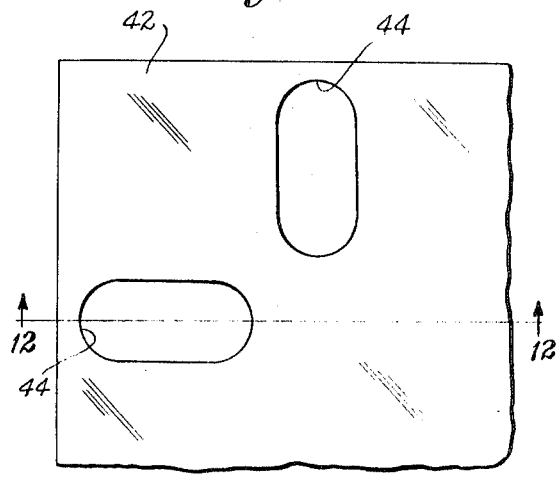
Figure 10:
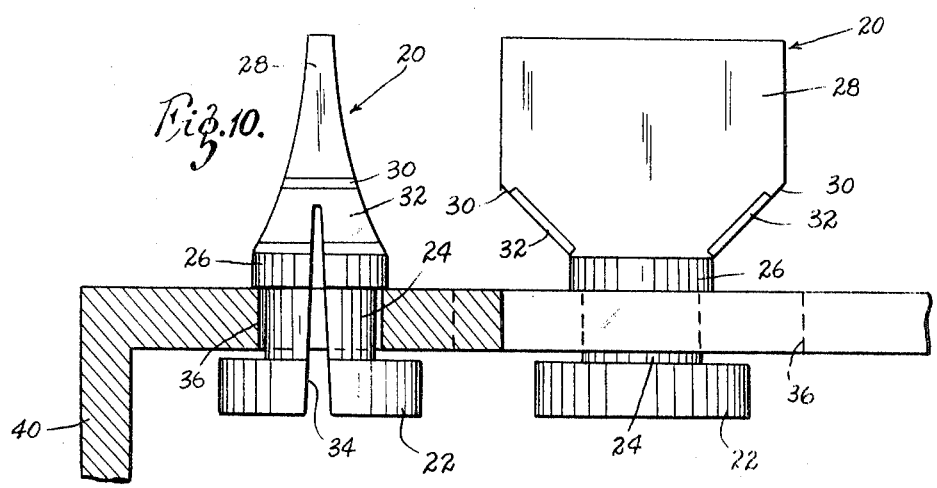
Figure 12:
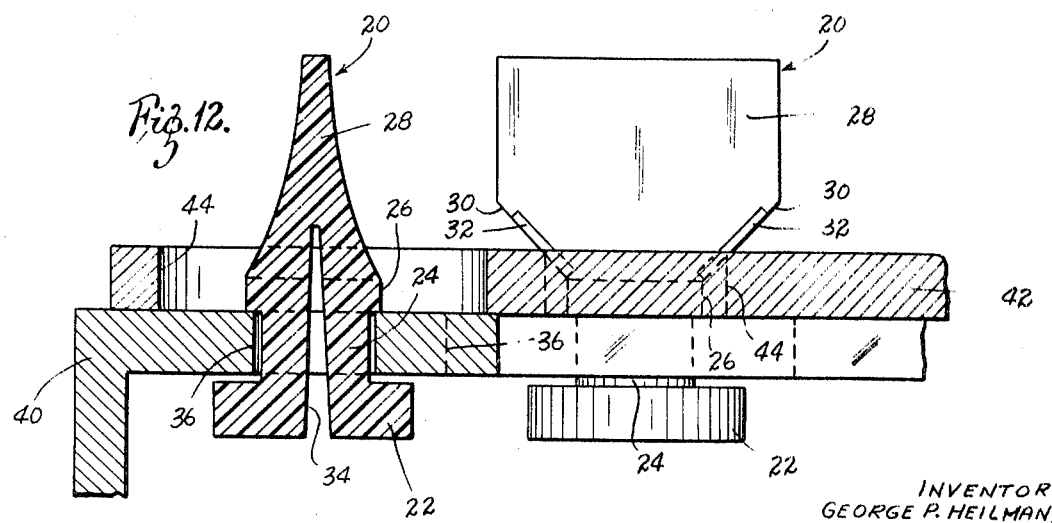

In the drawings:
FIG. 1 is a view in front elevation of the fastener;
FIG. 2 is a view in side elevation of the fastener;
FIG. 3 is a top plan view;
FIG. 4 is a bottom plan view;
FIG. 5 is a top view of the fastener shown connecting two plates;
FIG. 6 is a view in vertical section taken on the line 6—6 of FIG. 5;
FIG. 7 is a view in vertical section taken on the line 7—7 of FIG. 5;
FIG. 8 is a sectional plan view taken on line 8—8 of FIG. 7;
FIG. 9 is a fragmentary view of a frame plate used as a base for the fastener;
FIG. 10 is an enlarged view in section taken on the line 10—10 of FIG. 9 with the fastener inserted;
FIG. 11 is a fragmentary plan view of a top cover plate adapted to be fastened to the frame of FIG. 9; and
FIG. 12 is a view in section taken on the line 12—12 of FIG. 11 but with the addition of the frame of FIG. 9 and the fastener devices showing the inter-positioning of the elements before the fasteners are turned to locking position.

DESCRIPTION OF THE INVENTION

Referring now to the drawings, the fastener of this device is generally identified by the reference numeral 20 where it is shown in detail in FIGS. 1–4. The fastener is fabricated from conventional semi-rigid plastic, or similar material, having a slight degree of resiliency. It is comprised of a flat, shallow, cylindrical base portion 22, connected to a reduced cylindrical shank portion 24, and enlarged cylindrical base plate retainer portion 26, and a winged handle portion 28. The winged handle portion 28 has opposed cam surfaces 30 converging into the retainer portion 26. A wear surface 32 is provided in the cam surface where desired to provide for increased wear. As shown in FIG. 2, a converging slot 34 is provided in the base 22 through the shank and in to the head to provide for depression of the fastener so that it may be "popped" into the slot in the base plate.

The base plate with which the fastener is employed is shown in FIG. 6 and in FIG. 8, and it will be understood that any type of plate may be employed where the thickness is less than that of the distance between the base portion 22 and the retainer portion 26. A slot 36, as shown in FIG. 8, is provided to receive the fastener device. The slot has a length slightly greater than the length of the winged head 28 and a width slightly greater than the diameter of the shank 24 and slightly less than the diameter of the retainer portion.

The top plate, which is adapted to be removably fastened to the base plate by the fastener of this invention, is shown in FIG. 10. It will be understood that any type of top plate may be used, but that a slot is employed which has a width slightly greater than the diameter of the retainer portion 26 and a length slightly greater than the length of the winged head 28, such that the top plate may be placed in registry with the winged head. The thickness should be such that, as shown in FIG. 6, the top surface falls in a plane passing through the cam surface 30.

USE

The fastener of this invention is very simply used and is illustrated in use in FIGS. 5–11. FIGS. 5–7 show the fastener in locked position connecting two plates together, FIGS. 8–11 show the set up for a base plate and a top plate where the base plate is in the form of a frame to which the top plate, such as a cover or other type of connecting plate, may be affixed and locked by the fastener.

The fastener is very simply fastened to the base plate or the frame, as shown in FIGS. 8 and 9, by simply inserting the wing head through the underneath side of the frame 40, shown in FIG. 8, such that the wing head passes through the slot 36. By continued pressure, the shank and base 22 are pressed together as the converging sides of the winged head are pressed through the slot 36 and the fastener will move or be "popped" into the slot where the shank is received in the slot. This may be accomplished either by simply forcing the fastener through the slot or by using a tool to compress the opposed sides of the base 22 so as to reduce the diameter of the shank 24. FIG. 10 shows the fastener received within the base plate where it is retained by the retainer portion 26 resting on the top of the plate or frame 40, and the cylindrical base 22 positioned underneath the bottom of the frame.

The top plate or cover 42, shown in FIG. 10, is then placed in registry over the slots 36 of the frame 40. The slots 44 in the cover will receive the winged heads of the fastener in the position as shown in FIG. 11 when they are turned a quarter turn to be in registry. Locking is then simply effected by merely rotating the fastener by grasping the winged head and turning it a quarter turn, i.e., 90° where it will wedge into the slot 44 through the slight give or resiliency of the cam surface 30 with the top corner of the slot 44 to assume the locked position shown in FIGS. 5 and 12. The cover or top plate 42 is then securely locked in place. When it is desired to remove the cover or top plate, the fastener is then simply rotated 90° fom the position shown in FIGS. 5 and 12 and the cover is lifted off.

Various changes and modifications may be made within this invention as will be readily apparent to those skilled in the art. Such changes and modifications are within the scope and teaching of this invention as defined by the claims appended hereto.

What is claimed is:
1. A fastener for fastening superimposed bottom and top plates having superimposed slots, said slot in the top plate having substantially parallel side bearing edges, said fastener comprising a bottom head member, a shank receivable within the slot in the bottom plate, said fastener being further provided at the top with a member receivable within the slot in the top plate and, said member having an elongated cross-section and downwardly converging opposed ends defining a cam surface engageable by rotation of said member about the axis of the shank from a non-wedging relation to a wedging relation with the longitudinal parallel opposed bearing edges of said slot in the top plate.

2. The fastener of claim 1 in which the cam surface has a slight degree of resiliency to facilitate said wedging action.

3. The fastener of claim 1 in which the shank is provided with an enlarged retainer member extending beyond the longitudinal edges of the slot in the bottom member.

4. The fastener of claim 3 in which the enlarged retainer member is spaced from said bottom head a distance greater than the thickness of the bottom plate.

5. The fastener of claim 1 in which a longitudinal slot extends axially from said head through the shank whereby the opposite sides of the bottom portion of the fastener may be pressed together to reduce the diameter for reception within the slot in the bottom plate.

6. The fastener of claim 1 in which the top member has an elongated base portion provided with downwardly converging surfaces at opposite ends defining said cam surface.

7. The fastener of claim 6 in which the top member is in the form of a winged handle receivable within the slot of the top plate.

8. The fastener of claim 1 in which the cam surface is provided with wear plate means.

9. The fastener of claim 2 in which the fastener is constructed of a plastic material having semi-rigid characteristics.

10. The fastener of claim 3 in which the top member has an elongated base portion provided with downwardly converging surfaces at opposite ends defining said cam surface.

References Cited

UNITED STATES PATENTS

| | | | |
|---|---|---|---|
| 1,586,572 | 6/1926 | Morton | 24—221 |
| 1,900,574 | 3/1933 | Meader | 24—213R |
| 1,917,825 | 7/1933 | Carr | 24—213R |
| 2,184,250 | 12/1939 | Chaffee | 24—213R |
| 3,181,411 | 5/1965 | Mejlso | 24—213X |
| 3,238,586 | 3/1966 | Stoffel | 24—213 |
| 3,335,471 | 8/1967 | Seckerson et al. | 24—221 |
| 2,258,668 | 10/1941 | Zahodiakin | 85—5P |
| 3,123,389 | 3/1964 | Bilsecker | 24—221L |
| 3,179,367 | 4/1965 | Rapata | 24—221L |

FOREIGN PATENTS

| | | | |
|---|---|---|---|
| 472,858 | 4/1951 | Canada | 85—5P |
| 15,005 | 1912 | Great Britain | 85—5P |
| 397,790 | 8/1933 | Great Britain | 85—5R |
| 1,500,021 | 9/1967 | France | 85—5P |

JOHN PETRAKES, Primary Examiner

U.S. Cl. X.R.

85—5P